Aug. 22, 1939.  F. A. MIRANDO ET AL  2,170,537
KNIFE HANDLE AND COMPONENT PARTS THEREOF
Filed July 6, 1938  2 Sheets-Sheet 1
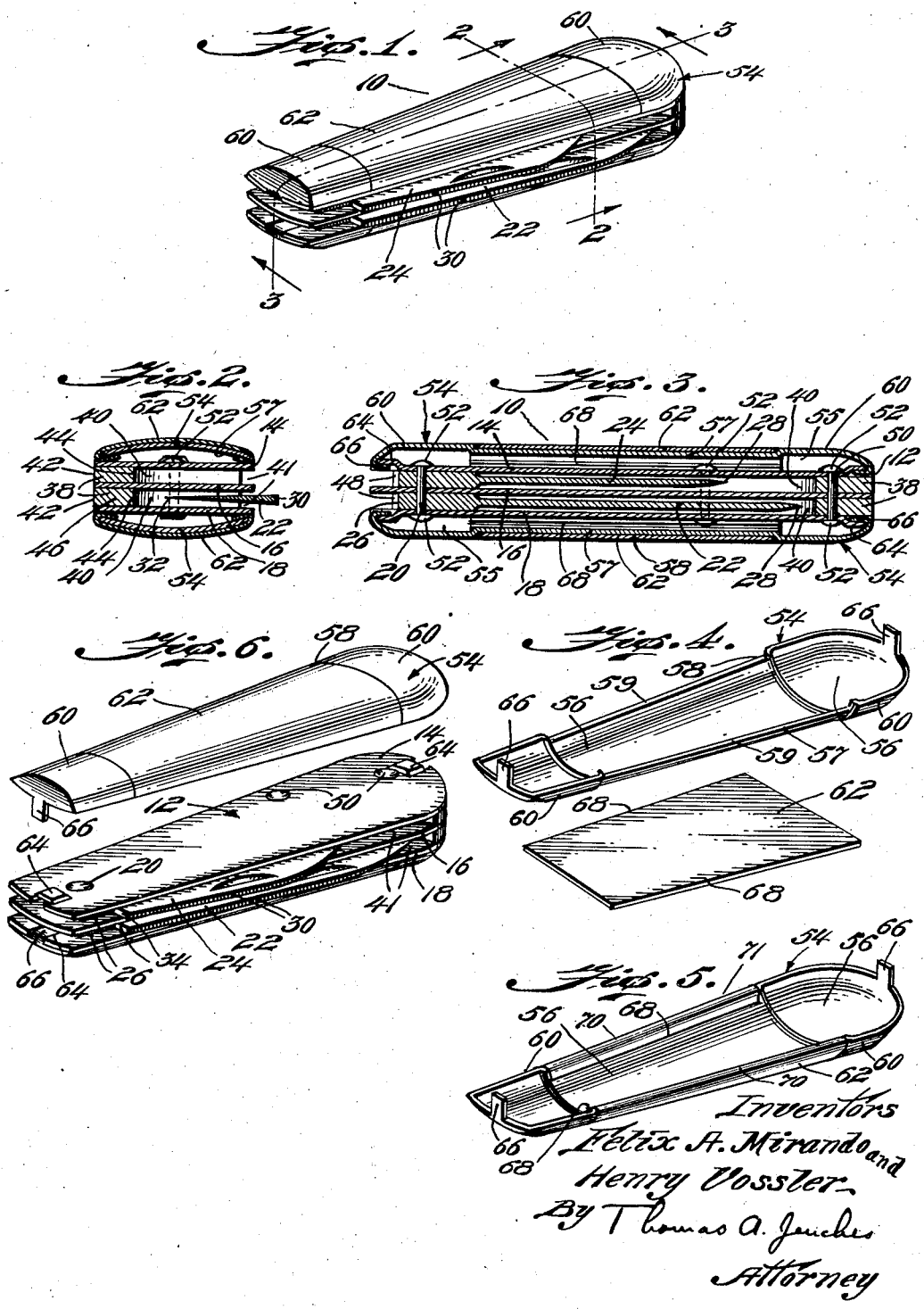

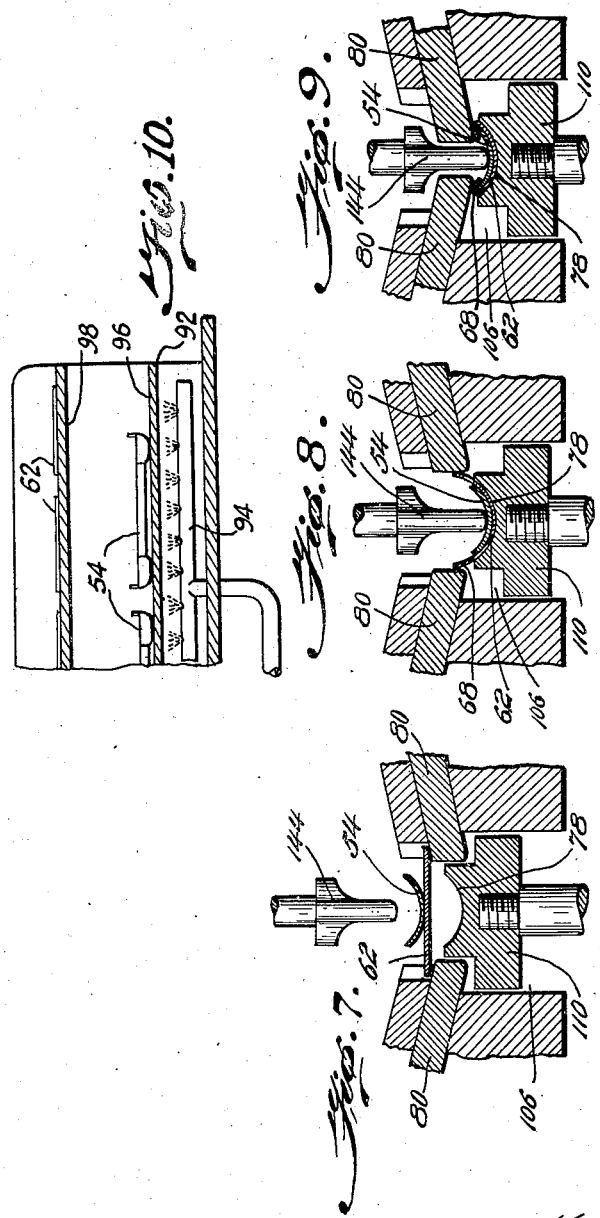

Patented Aug. 22, 1939

2,170,537

UNITED STATES PATENT OFFICE 2,170,537

KNIFE HANDLE AND COMPONENT PARTS THEREOF

Felix A. Mirando and Henry Vossler, Providence, R. I., assignors to Imperial Knife Co., Inc., Providence, R. I., a corporation of Rhode Island Application July 6, 1938, Serial No. 217,826

3 Claims. (Cl. 30—164)

Our invention relates to improvements in knife handles.

One of the objects of our invention is to provide an improved ornamental knife scale adapted to be secured to a scale supporting member having tips or bolsters.

Still another object of our invention is to provide a knife handle which shall comprise relatively few and simple parts and which shall be simple to assemble, rugged in construction, economical to manufacture, and which shall at the same time present a general improvement in the art.

In attaining the objects of this invention, a scale member is formed from plastic composition material and is so constructed that it may be readily attached to a supporting member having tips or bolsters and held secured to said supporting member by pressure or force applied during the attaching operation. In this way the scale member is, so to speak, self-holding, requires no separate means for securing the same in place, and is secured simultaneously with the assembling of the supporting member and scale member.

Apart from the simplicity of construction and ease of assembly, the invention makes it possible for the scale member to have any ornamental appearance or decoration since that can be easily controlled by varying the mixture of the plastic composition and thus producing ornamental effects of the kind well known in such materials.

Other objects of our invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a perspective view of a jack knife constructed in accordance with our invention.

Fig. 2 is a cross sectional view therethrough taken along the line 2—2 of Fig. 1.

Fig. 3 is a longitudinal sectional view taken therethrough along the line 3—3 of Fig. 1.

Fig. 4 is a disassembled perspective view illustrating a sheet of flat ornamental scale forming plastic material in position to be wrapped around the center inset portion of the combination scale holding and bolster or tip forming member with said member inverted.

Fig. 5 is a perspective view of an inverted combination scale holding and bolster or tip forming member after the scale forming plastic sheet has been wrapped over the inset center portion and around the edges thereof in accordance with our improved method to provide a scale portion.

Fig. 6 is a perspective view of a combination scale holding and tip or bolster forming member with a sheet of scale forming plastic material wrapped around the inset center portion thereof about to be attached to an assembled knife handle frame employing our preferred means of attachment.

Figs. 7, 8 and 9 are vertical sectional views taken through a suitable type of press and illustrating a means for securing the scale member to the scale holding member.

Fig. 10 is a vertical sectional view of a suitable heating oven having a hotter zone for heating the scale holding members and a less hot zone for heating the plastic sheets and adapted in use to be adjacent the press.

In the drawings, wherein like characters of reference generally indicate like parts throughout, 10 generally indicates a jack knife constructed in accordance with the principles of our invention.

Our improved construction employs a standard type of knife handle frame 12, comprising spaced top, bottom and intermediate lining sheets 14, 16 and 18, respectively, having a pivot rivet 20 joining said lining sheets together at one end thereof and the large and small knife blades 22 and 24 each having a mounting end pivotally mounted on said pivot rivet 20, said mounting end being arcuately curved as at 26 as usual. Each blade contains an opposite pointed end 28, an outer blunt edge 30 and an inner sharp edge 32. The outer blunt edge 30 is inset as at 34 from a point interior of said pivot rivet to said curved mounting end 26 to provide at this point a stop shoulder 34. The standard type of knife handle frame also includes the block spacing members 38, one for each blade interposed between said lining sheets 14, 16 and 18, each having a cut out portion at one side thereof extending concavely inwardly as at 40 at one end thereof to receive the pointed end 28 of its respective blade, and then substantially parallel to the opposite side wall 42 thereof as at 44 to provide a compartment 41 for holding the sharp edge 32 of the knife blade in closed position and to provide a resilient leaf 46 to yieldingly resiliently abut the curved mounting end 26 of each blade and terminating near the mounting pivot end of said lining member as at 48 to abut said blade stop shoulder 34 near the curved mounting end of said blade to retain said blade in open position in line with said handle frame 12. Supplemental rivets 50 are also provided extending through said lining sheets 14, 16 and 18 and block spacing members 38 to join said sheets and members together to provide a knife handle frame. In the prior art both the joining rivets 50 and the pivot rivet 20 have had to be of relatively small size so that the heads 52 thereof could be ground down to be flush with the top and bottom surfaces of said respective lining members 14 and 18, to receive the inner flat surfaces of the flat scales and tips or bolsters formerly employed evenly thereon.

Employing our invention, as shown more particularly in Figs. 2 and 3 we may employ larger size pivot and other rivets 20 and 50 which may be provided with large upset heads projecting outwardly from the outer surfaces of the top and bottom lining sheets 14 and 18 respectively. With the exception of the size of the rivets, we have described hitherto a standard type of knife handle frame commonly used in the art.

As stated hitherto, our invention particularly relates to the type and means of ornamentation we preferably provide for the top and bottom surfaces of said jack knife frame 12. Instead of providing the separate thick sheets or scale portions and separate tip or bolster end portions as this means of ornamentation, which, as stated, have been formerly separately riveted to the knife handle frame, we provide combination scale holding and bolster or tip forming members 54 for covering the top and bottom surfaces of said frame, said members being of the general configuration of the top and bottom walls of said frame. While said members may be stamped, molded or otherwise constructed of solid formation, in our preferred embodiment, each preferably comprises an elongated inverted oblong cup of the configuration of the top or bottom wall of said frame, each member therefore being provided with an interior cupped portion 56 forming a space 55 between the outer wall 57 of each member and the outer surface of the top and bottom lining sheets 14 and 18 of the knife handle frame 12 to receive therein the enlarged heads 52 of the large respective rivets 20 and 50 hitherto described. It is apparent that our improved combination members may be readily stamped, pressed or otherwise fabricated from sheet material in this cup formation. In our preferred embodiment, each of said members is preferably provided with an inset elongated scale holding center portion 58 which may be readily stamped, pressed, or otherwise formed in the fabrication of our improved combination members, thereby providing the bolsters or tips 60 at each end of our improved combination member 54 projecting outwards above said inset center portion 58. If the exposed metal surfaces 60 at the ends of said combination members 54 are of considerable length they have been called bolsters in the trade but if they are of relatively short length they have been called tips in the trade and it is immaterial in so far as our invention is concerned whether said end portions be of such a length as to provide bolsters or tips.

We also provide scale forming coverings 62, each comprising a sheet of covering material, in our preferred embodiment shown, of ornamental plastic material extending over the surface of and secured to the center inset portion 58 of each respective combination member 54.

While our improved combination members 54 are preferably constructed of stamped or pressed metal, it is apparent they may be constructed of plastic or any other suitable material. While any means may be employed for securing our improved combination members 54 to the top and bottom surfaces of the knife handle frame 12, in our preferred embodiment we preferably provide the top and bottom lining sheets 14 and 18 with the raised longitudinal notch forming portions 64 at the center portion of each end thereof which notch forming portions may be readily stamped in said lining sheets as they are being stamped or otherwise fabricated, and we provide a projection 66 projecting downwardly from each end of each member 54 adapted to be bent to slide into each respective longitudinal frame notch 64 to retain its respective member 54 to said handle frame 12. It is apparent, however, that, if desired, other means may be employed for securing the respective combination members to the top and bottom surfaces of said knife handle frame and for this purpose the ends of the combination members 54 may, if desired, be alternatively soldered or spot welded to the ends of the respective top and bottom surfaces of the handle frame.

While we preferably employ a plastic material, such as ornamental Celluloid, synthetic resin of the phenol or urea formaldehyde condensation or other type, cellulose acetate, rubber or otherwise as our improved plastic covering sheet 62, it is apparent that the covering sheet may comprise any other suitable plasticizable resilient material.

While our improved covering sheet of thin plastic material extending over said scale holding member may be secured to or plasticized to said scale holding member to extend in shrunk, drum tight condition over the surface thereof we preferably fold the edges 68 of said plastic sheet 62 under the inset edges of said center portion 58 of said scale holding member 54 when in a plastic condition along the respective lines of folding only to retain said plastic sheet 62 over the surface of the inset center portion 58 of said scale holding member in shrunk, drum tight condition when deplasticized without other retaining means. In this manner the scale 62 may be supported on the scale supporting member 54 independent of all other agencies such as for example the knife frame 12 and is thereby wholly self-held to the said scale supporting member. The plastic sheet 62 is preferably superimposed over the surface of said center inset portion when in a semi-plastic condition and the edges 68 thereof readily folded over the inset edges 59 of said center portion 58 and suitable heat is provided along the fold lines 70 only by means of applying greater pressure against said fold lines to plasticize the covering along the fold lines only so that it may be shrunk on said device along said fold lines only. As stated hitherto, we have discovered that if the entire plastic sheet be rendered plastic it will shrink so much on cooling that gaps will be left at each end of the plastic sheet within the respective ends of the inset portion 58. If, however, the plastic sheet be rendered plastic along said fold lines only there will be no appreciable longitudinal shrinkage thereof and only sufficient transverse shrinkage to insure that the sheet will extend in shrunk, drum tight condition over the surface of said inset portion.

Employing our invention we are also enabled to save a large amount of scale forming material formerly thought necessary as we may employ sheets of plastic material even of a thickness of .010–.030 inch.

We form an oblong, thin sheet of plastic covering material 62 of substantially greater width than that of said inset center portion 58 of said scale holding member 54. We then as diagrammatically illustrated in Fig. 10 suitably heat said plastic sheets to a semi-plastic condition in the embodiment shown, to about 100° to 120° F. and said scale holding members to a greater degree in the embodiment shown, to from 200° to 300° F. We then as shown in Fig. 7 relatively superimpose said scale holding member 54 on a sheet 62 and exert sufficient relatively slightly yieldable pressure against said scale holding member and plastic sheet through a forming tool 144 to bend it against a heated surface, such as that of the forming die 78 of substantially equal width and length and substantially similarly transversely arched as the surface of the inset center portion of said scale holding member to similarly shape said plastic sheet in concave formation as shown in Fig. 8, permitting the edges 68 of said sheet to project obliquely upwardly from said yieldingly compressed arched surfaces. We then, by suitable means, bend the then upturned edges 68 of the covering sheet 62 inwardly over the edges 59 of said scale holding member and apply sufficient pressure against the thus formed fold lines 70 to render them plastic, whereby on cooling said plastic sheet will shrink laterally along said fold lines 70 only to retain said covering over the surface of the inset center portion of said scale holding member in shrunk, drum tight condition without other retaining means and without substantial longitudinal shrinkage of said covering. To bend the upturned edges 68 of said covering material we preferably move the heated members 80 obliquely laterally and downwardly over the edges of said inset center portion of said scale holding member at a lesser distance than the thickness of said plastic sheet to fold the edges of said plastic sheet over the edges of said inset center portion of said scale holding member. We thus apply sufficient pressure between said plastic sheet and the edges 59 of said center portion 58 of said scale holding member to apply sufficient heat to the thus formed fold lines 70 to render them plastic, whereby after removing said thus assembled means from said movable means on the cooling or deplasticizing of said fold lines of said covering, the covering will shrink laterally along said folding lines only to achieve the afore-described results.

We may, however, render the entire covering plastic during the heat treatment but if we do it will tend to shrink longitudinally to have gaps at the ends thereof and laterally so that the edges may unbend. While the edges thereof may be bent without heating they will not retain a set position to shrink the covering over the surface of the holding member in drum tight condition.

As stated, the plastic sheet and scale holding member are only yieldably held together with a slight degree of pressure and tension leaving a certain amount of occluded insulating gases between them, which prevent sufficient rapid conduction of heat to permit the entire surface of the plastic sheet to become plastic. It is only where sufficient pressure is applied against the infolded edges 70 of said plastic sheets to compress them strongly against the edges 59 of the scale holding member 54 that any substantial amount of heat conduction takes place.

While in the foregoing description our new knife handle covering means has been described with reference to one method and appartus for producing the same, it will be understood that the present invention relates only to the article.

It is apparent, therefore, that we provide a novel type of knife handle having novel types of component ornamental parts with the advantages described above and novel methods of and apparatus for its manufacture.

It is understood that our invention is not limited to the specific embodiments shown and that various deviations may be made therefrom without departing from the spirit and scope of the appended claims.

What we claim is:

1. Covering means for a knife comprising an elongated interiorly concaved member having a middle portion and end portions, said end portions extending slightly above said middle portion, a resilient separable scale member, and means to immovably secure said scale member to said concaved member in locked engagement therewith, said securing means comprising edge portions integral with said scale member and underlying said concaved member, said scale member abutting said end portions.

2. Covering means for a knife comprising an elongated interiorly concaved member having a middle portion and end portions, said end portions extending slightly above said middle portion, a separable resilient scale member, and means to immovably secure said scale member to said concaved member in locked engagement therewith, said securing means comprising opposed portions of said scale member pressed against edges of said concaved member and said securing means additionally comprising scale member portions underlying said concaved member.

3. A covering unit for a knife, comprising a separate supporting member having a bolster at each end thereof and a resilient separable onamental scale member mounted on said supporting member with its ends in abutting relationship with said bolster, said scale member additionally having wholly self-contained means for maintaining itself in substantially immovable attachment to said supporting member, said means comprising opposed portions of said scale member in frictional engagement with said supporting member.

FELIX A. MIRANDO.
HENRY VOSSLER.